United States Patent [19]

Chaum

[11] Patent Number: 4,991,210

[45] Date of Patent: Feb. 5, 1991

[54] UNPREDICTABLE BLIND SIGNATURE SYSTEMS

[76] Inventor: David Chaum, 14652 Sutton St., Sherman Oaks, Calif. 91403

[21] Appl. No.: 347,303

[22] Filed: May 4, 1989

[51] Int. Cl.$^5$ .............................................. H04L 9/30
[52] U.S. Cl. ........................................ 380/30; 380/23; 380/25; 380/28; 380/49
[58] Field of Search ............... 380/6, 9, 28, 30, 44, 380/49, 50, 23, 25

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,405,829 | 9/1983 | Rivest et al. | 380/30 |
| 4,424,414 | 1/1984 | Hellman et al. | 380/30 |
| 4,458,109 | 7/1984 | Mueller-Schloer | 380/30 |
| 4,731,841 | 3/1988 | Rosen et al. | 380/28 X |
| 4,759,063 | 7/1988 | Chaum | 380/30 |
| 4,759,064 | 7/1988 | Chaum | 380/30 |
| 4,811,393 | 3/1989 | Hazard | 380/28 X |

Primary Examiner—Stephen C. Buczinski
Assistant Examiner—Bernarr Earl Gregory
Attorney, Agent, or Firm—Nixon & Vanderhye

[57] ABSTRACT

Blind signature systems secure against chosen message attack are disclosed. Multiple candidate original messages can be accommodated. Each of plural candidates in the final signature can be marked by the party issuing the signature in a way that is unmodifiable by the party receiving the signatures. The exponents on the candidates in the final signature need not be predictable by either party. In some embodiments, these exponents are not at all or are only partly determined by the candidates in the signature shown. Single candidate signatures are also accommodated.

4 Claims, 6 Drawing Sheets

P

B

101
$i \in \{1,...,s\}$
$r_i, x_i, c(i), c, r$ = random
$[11]_i \to B: r_i Pf(x_i)^{c(i)c} \mod p$
$q = h([11]_1,...,[11]_s)$
$n = r^p q$ 102
$v$ = random
$[12] P \leftarrow : v$ 103
$| [12] | ?=? t$
$j \in \{1,...,s\} - [12]$
$[13.1]_j \to B: r_j$
$[13.2]_j \to B: x_j$
$[13.3](j) \to B: c(i)c \mod p$
$k, k' \in [12]$
$d(k) = g(n, f(x_k), \prod f(x_{k'}))$
$[13.4]_k \to B: d(k)/c(k) \mod p$ 104
$j \in \{1,...,s\} - v$
$[11]_j ?=? [13.1]_j Pf([13.2]_j)^{[13.3](j)}$
$d$ = random
$k \in v$
$w$ = random
$z(k) = d[13.4]_k e(w(k)) \mod p$
$[14.1] P \leftarrow : d$
$[14.2] P \leftarrow : w$
$[14.3] P \leftarrow : (h([11]_1,...,[11]_s)\prod[11]_k^{z(k)})^{1/p}$ 105
$z'(k) = [14.1][13.4]_k e([14.2](k)) \mod p$
$[14.3]^p ?=? q\prod[11]_k^{z'(k)}$
$u(k) = z'(k)(c(k)c \mod p) \text{ div } p$
$n' = r[14.3]/\prod r_k^{z'(k)}f(x_k)^{u(k)}$
$x'[14.2](k) = x_k$

201
```
[21.1] → S: n'
[21.2] → S: n
[21.3] → S: [14.1]c mod p
i ∈ {1,...,t}
[21.4]ᵢ → S: x'ᵢ
```

202
$i, i' \in \{1,...,t\}$
$d'(i) = g([21.2], [21.4]_i, \Pi[21.4]_{i'})$
$[21.1]p \ ?=? \ [21.2]\Pi f([21.4]_i)^{d'(i)}[21.3]e(i) \bmod p$

501
x, r, s, c = random
[51.1] → B: $r^p f(x)$
q = h([51.1])
n = $q^c s^p$
d = g(n)
[51.2] → B: dc mod p
a = q[51.2]
b = $q^{dc\ div\ p} s^{d/r}$

B

502
[52] P ← : $(h([51.1])^{[51.2]}[51.1])^{1/p}$

503
[52]$^p$ ?=? a[51.1]
n' = b[52]

P

601
[61.1] → S: n'
[61.2] → S: n
[61.3] → S: x

S

602
[61.1]$^p$ ?=?
[61.2]g([61.2])f([61.3])

FIG. 6

UNPREDICTABLE BLIND SIGNATURE SYSTEMS

BACKGROUND OF THE INVENTION

1. Field of the Invention

This invention relates to transaction systems, and more specifically to improved cryptographic techniques involving public-key digital blind signatures.

2. Description of Prior Art

Blind signature techniques were first disclosed in U.S. Pat. No. 4,759,063, titled "Blind Signature Systems," issued to the present applicant, also appearing as European Patent Publication No. 0139313 dated Feb. 5, 1985, and which is incorporated herein by reference.

One possible criticism of the particular exemplary embodiment disclosed there is that it requires the underlying signature system to be secure against a "chosen message" attack. In such attacks, the provider party P chooses a special dangerous message, obtains a signature on it, and then is able to use this signature to break the whole signature scheme. Of course it is not presently known whether such dangerous messages can be found for the well known RSA system.

In any case, ways to prevent such release of chosen roots are known, such as, for example, the techniques disclosed in a co-pending application of the present applicant, titled "One-Show Blind Signature Systems," filed Mar. 3, 1988, with U.S. Ser. No. 168802, now U.S. Pat. No. 4,914,698, and which is also incorporated herein by reference. These systems use a plurality of "candidate" messages, some subset of which appear in the final signature. Because the candidates that do not appear in the final signature can be inspected by B before the signature is issued, B obtains (with high probability) control over the content of the candidates appearing in the signature. Consequently, a chosen message attack against these systems has a low chance of success.

Multiple candidate systems proposed so far, though, do suffer from some shortcomings. One is that the number of candidates needed to offer the desired low probability of success for chosen message attacks may be a larger number than is required for the other properties of the signatures. Thus, some economy could be obtained by reducing the number of candidates, while still offering protection against the conceivable danger of chosen message attacks.

Another area for improvement is in the "marking" of the candidates when they appear in the final signatures; each such candidate may be forced to appear under a different mark (or type indication) chosen for it by B. But such marking techniques known so far require different roots for each kind of mark, which in turn substantially increases the number of modular multiplies needed in applying the systems.

A third deficiency of known multiple candidate systems is that, in the signature, the exponents on each candidate are chosen by P. Increased security against some attacks can be achieved if P is unable to choose these exponents.

BRIEF SUMMARY OF THE INVENTION

Accordingly, an object of the present invention is to provide blind signatures with original messages of a type that are chosen by the providing party but that do not allow the providing party to obtain roots on numbers freely chosen by the providing party.

Another object of the present invention is, in the context of blind signatures issued on multiple candidates, to prevent the provider party from being able to determine which powers of the candidates will be contained in the resulting signature. This is believed to make it difficult or infeasible for providers to combine multiple-candidate signatures in efforts to produce other verifiable such signatures.

A further object of the invention is, in some embodiments, to allow at least part of the public-key cryptographic computations to be performed in advance of the interaction between a provider party and a blind signature issuing party.

Yet another object of the invention is to remove the need for any public-key computations by the provider party during the signature issuing interaction, even when the set of candidates to be signed is determined only in the interaction.

A still further object of the invention is to allow candidates to be differently marked within the resulting signature in a way that is known by the blind signature issuing party and substantially unreplaceable by the provider party, yet without requiring different roots on different candidates.

Still another object of the present invention is to allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

FIG. 2 shows a flowchart of a first preferred embodiment of a blind signature showing protocol between a provider party and a signature checking party in accordance with the teachings of the present invention.

FIG. 5 shows a flowchart of a preferred embodiment of a third blind signature issuing protocol between a provider party and a blind signature issuing party in accordance with the teachings of the present invention.

FIG. 6 shows a flowchart of a preferred embodiment of a third blind signature showing protocol between a provider party and a signature checking party in accordance with the teachings of the present invention.

Figure 7:
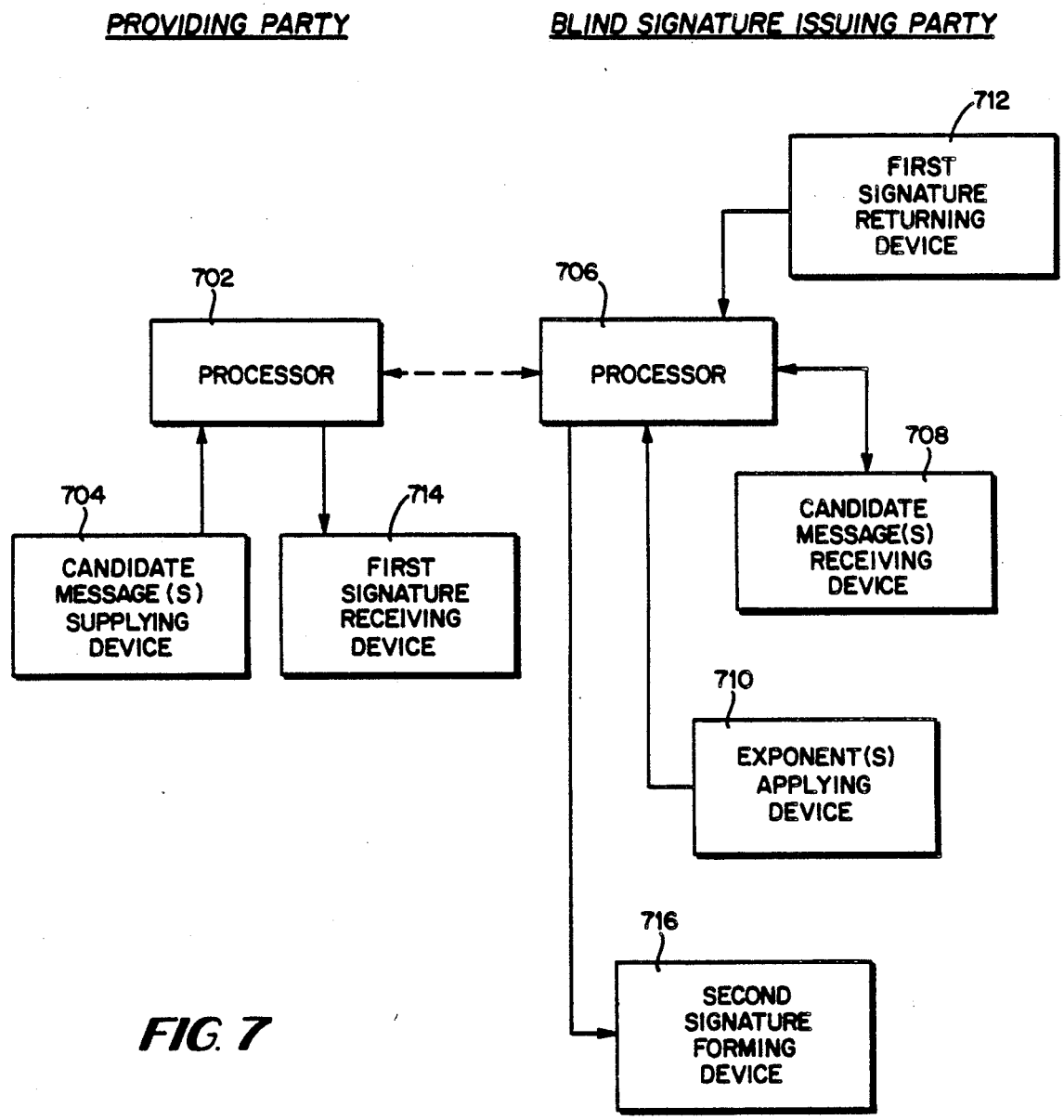

FIG. 7 symbolically depicts apparatus for practicing the exemplary methods of this invention.

DETAILED DESCRIPTION OF THE EXEMPLARY EMBODIMENTS

In accordance with the forgoing and other objects of the present invention, a brief summary of some exemplary embodiments will now be presented. Some simplifications and omissions may be made in this summary, which is intended to highlight and introduce some aspects of the present invention, but not to limit its scope in any way. Detailed descriptions of preferred exemplary embodiments adequate to allow those of ordinary skill in the art to make and use the inventive concepts are provided later.

It will be understood by those in the art that the flow charts depicted in FIGS. 1-6 are symbolic representations of both method and apparatus for implementing this invention. The depicted blocks may be realized, for example, by conventional general purpose data processing hardware programmed to perform the depicted data processing steps. Alternatively, one may use special purpose data processing hardware using conventional hardware design methods to devise circuits to perform the depicted data processing steps. The depicted interconnecting lines in FIGS. 1-6 may be realized by conventional data communication devices and circuits.

Brevity of summary is, as will be appreciated, facilitated by considering quite particular special cases, and starting from concrete forms of the signatures themselves. A signature, accordingly, will be a p'th root in an RSA system, where p is a large prime. This root is, however, taken on a product of three values, and will have the following form:

$$(f(x)^{b+g(n,x,xy)} f(y)^{1+b+g(n,x,xy)} n)^{1/p}.$$

The $f$ and $g$ functions can be taken as one-way functions, such as those that could be constructed from the well known DES algorithm. When the value of such an expression is sent to be checked, it is accompanied by four values: n, x, y, and b. The recipient can then readily combine these four values in the way specified within the above expression, and test that this combined value is equal to the result of raising the signature itself to the p'th power.

An essential requirement of any signature scheme is to prevent outright forgery. Because S has no redundancy property to check for n, such signatures could trivially be forged if it were not for the g functions in the exponents. With these functions, though, it is believed that a forger would have to produce many values whose p'th roots are known, before one is found that happens to satisfy the above expression for known x and y.

The signature issuing protocol, to be described, can prevent P from being able to choose the value b. A believed result, that will be appreciated more fully in light of the detailed descriptions that follow, is that various sorts of attacks are made difficult. These attacks include, for instance, the building of images under $f$ into n, the adjusting of what should be a single image under $f$ to be a quotient of such images, or the combining of various signatures to form a new signature.

Furthermore, once a signature has been issued by B, it is believed difficult for the value of b to be changed by P because this would seem to imply that P could compute p'th roots on images under $f$. Similarly, it is believed difficult for P to change the ordering of x and y because of the +1 shown in the exponent of the factor containing y.

So far the example has related particularly to FIGS. 1-4; the following example relates more particularly to FIGS. 5-6:

$$(n^{g(n)} f(x))^{1/p}.$$

The inventive techniques allow blind signatures. The properties of such signatures are, on the one hand, believed to imply that the particular values revealed to S in showing a signature cannot be recognized by B as related to those known when the signature was issued. But on the other hand, it seems that B needs to work with the structure of the signature in order to form it. These apparent contradictions are resolved partly by combining and adapting known blind signature techniques and novel techniques in novel ways, as will be appreciated from the detailed disclosures to be presented.

GENERAL DESCRIPTION

The protocols to be described in detail later and the drawing figures make a number of simplifying assumptions for concreteness and for clarity in exposition. It will be appreciated, however, that these should not be taken to limit the scope of the invention.

FIGS. 1-4 show systems with t candidates per signature, FIGS. 5-6 show only one candidate. These choices are arbitrary and are for clarity in exposition, since all the embodiments can accommodate any number of candidates. For example, FIGS. 1-2 can take a single candidate by setting t, c, and d to 1. Similarly, FIGS. 3-4 can be used by setting c and d to 0 and t to 1. FIGS. 5-6 can have the product of any number of candidates replace the single one shown in the signature.

When only a single candidate is used, or otherwise when marking is not desired, the e function can just be constant. Suitable values for this might be 1 for FIGS. 1-2 and 0 for FIGS. 3-4. This function can also be applied in FIGS. 5-6 when multiple candidates are used; it may then enter either multiplicatively or additively.

As another example, it will be clear to those of skill in the art that a public exponent on one factor can be moved to other factors simply by raising the whole signature to a public power. Thus, the particular factor on which exponents are placed is only chosen for convenience in exposition.

Furthermore, the exemplary embodiments show only a single n factor, but of course more than one could be used. Different exponents could be placed on these factors, possibly in addition to those on the candidates. Additionally, there is no reason why public constants cannot be used in a way similar to the n in FIGS. 5-6. The exemplary embodiments are believed to show that such constants are not needed and do not offer any anticipated advantages, but the scope of the present invention should not be interpreted to exclude such believed superfluities.

The way the q (or multiple q's as might be used for multiple n's as just mentioned) are created is shown differently in the various figures. Clearly the techniques used in any one figure could as well be applied in any other; the differences having been included to illustrate the major approaches and are independent of the other choices illustrated in the corresponding figures.

The function g may be any suitable one-way function or, as is anticipated, a function not strictly requiring the one-way property. It is believed necessary to include n (or all the n's if there are more than one as mentioned above) as argument(s) of g. Including candidates as arguments of g, as shown is believed to improve security against certain kinds of attacks. In some embodiments, each g might only have its own candidate as additional argument. FIGS. 1-4 show an argument of g as a product of factors. This product could clearly be replaced by a concatenation of such factors in lexicographic order, and additionally the second argument could then just determine the particular substring of the result corresponding to its position in that ordering. Other commutative operations besides multiplication are of course also suitable for forming an unordered combination of candidates within g; any other fixed ordering, besides lexicographic, or any random ordering, of candidates could of course be used.

Moreover, the three basic approaches illustrated in FIGS. 1-2, 3-4, and 5-6 are readily combineable, such combinations not being illustrated for clarity. It is believed that to avoid the chosen message attacks already mentioned, the public exponents of all roots in a signature should divide (at least one) n. Thus, each factor in the signature may receive a different root. These different roots may of course use different embodiments from the pairs of figures or variations mentioned. Particular advantage is anticipated in using roots on the n(s) with public exponents having factors or multiplicities not appearing on other factors.

As a further example, when multiple embodiments are combined, some of the subgroups of the public exponents on some factors could be allowed to unlinkably vary freely without any extra requirement on them when the signature is shown. One way to accomplish this is simply for B to substitute random values in place of the exponents normally requested by P and then inform P of these random values when the signature is issued.

The choice of party names, and the number of parties are examples of choices made for clarity and convenience. Naturally, the inventive concepts disclosed here should not be interpreted as limited to particular types of parties or any other implications of naming conventions or the like.

DETAILED DESCRIPTION OF PREFERRED EMBODIMENTS

While it is believed that the notation of FIGS. 1-4 would be clear to those of ordinary skill in the art, it is first reviewed here for definiteness.

The operations performed are grouped together into flowchart boxes. The column that a box is in indicates which party performs the operations defined in that box. The columns are labeled by party name across the top: "P" for provider, "S" for signature checker, and "B" for blind signature issuer.

One kind of operation is an equality test. The "?=?" symbol is used to indicate such a test, and the party conducting the test terminates the protocol if the equality does not hold. (If the test is the last operation to be performed by a party during a protocol, then the success or failure of the test determines the party's success or failure with the protocol.)

Another kind of operation is that of sending a message. This is shown by a message number on the left; followed by a recipient name and an arrow (these appear for readability as either a recipient name then left pointing arrow, when the recipient is on the left; or right pointing arrow then recipient name, when the recipient is on the right); followed by a colon; finally followed by an expression denoting the actual value of the message that should be sent, shown using variables whose values are known to the sender. (These operations are depicted in a "bold" typeface for clarity.) Square brackets are used to delimit message numbers and such an expression stands for the value of the corresponding message.

The further operation of saving a value under a symbolic name is denoted by the symbolic name on the left hand side of an equal sign and an expression on the right hand side.

Several kinds of expressions are used. One is just the word "random." This indicates that a value is preferably chosen uniformly from an appropriate set of values defined in the text and independently of everything else in the protocol. Thus a party should preferably employ a physical random number generator for these purposes, possibly with appropriate post-processing. In practice, however, well known keyed and unkeyed cryptographic and pseudo-random techniques may be applied, possibly in combination with physical sources.

A further kind of expression involves exponentiation. All such exponentiation is in a finite group, say, for example, the multiplicative group modulo an RSA modulus m. When no operation is shown explicitly, multiplication in such a group is assumed. When "/" is applied between elements of such a group, the result can be calculated by first computing the multiplicative inverse of the expression on the right and then multiplying it by the expression on the left—but this operation may also be described simply as division. When the "/" is used between exponents, and if the result is a proper fraction, it indicates a corresponding root, as is well known in the art.

Suitable RSA moduli have been proposed in "A method for obtaining digital signatures and public-key cryptosystems," by Rivest, Shamir and Adleman, *Communications of the ACM*, Feb. 1978, pp. 120-126. For simplicity, concreteness, and clarity, and without loss of generality, all elements subject to exponentiation will be taken to be residues modulo the RSA modulus m of party B, unless mentioned otherwise. The public exponents of party B used in all the figures are taken for simplicity to be prime p:, although generalization to composite values would be obvious to those of skill in the art. Also for simplicity, as is common practice in the art, p will be assumed coprime with the order of the multiplicative group used in the exponentiation.

If computations for the exponents are done modulo p, this is shown by an explicit "mod p." Other parts of these calculations are done over the integers, and sometimes they use the operation "div," which may be thought of as the integer part of the quotient when the value on the left side is divided by that on the right.

The functions f and h are public one-way functions whose images are elements of the multiplicative group modulo m. The functions are taken to be "collision free" in the usual sense that it is believed computationally difficult to find multiple pre-images that result in the same image. As would be obvious to those of skill in the art, it should be difficult to find any structure in these functions that can be related to the group or field structure of their images.

Another public one-way function notation used is g. In some embodiments, g can be thought of as a single function where part of the output string is selected by the second argument. While no single part of the output would usually be called collision free if the size of parts allows them to be exhaustively searched, such as having only millions or billions of possibilities; but any combination of parts that cannot be exhaustively searched is preferably collision free.

Yet another function used is e. Its single argument is an integer between 1 and the number of candidates t. The result of e may be regarded modulo p, because of the way that it will be used. In some embodiments, such as those of FIGS. 3-4, the value 0 is not desired and may be omitted from the range of e. Other embodiments might omit values that are not comprime with a composite p, as was mentioned. In some embodiments, e may be the constant function, for example always returning 1 or always returning 0. In other embodiments it may be the identity function, returning its argument as its result. It would be obvious to those of skill in the art how any other mapping satisfying the above criteria could be used. For example, it is anticipated that if the range of e is coarsely spread over the possible values, security may be enhanced slightly. Another example would give multiple pre-images to certain images under e, thereby allowing multiple candidates to have the same marking.

Another type of expression used in the exemplary embodiments relates to ordered sets of integers. For example, $\{1,\ldots,t\}$ denotes the set of integers from 1 to t inclusive in increasing order. Such sets may be combined with "−", the usual set difference operation, where the resulting order is fixed by some convention. The set membership symbol "$\in$" is used to define an index variable that runs over all the values in a set; thus, computations and messages involving an index variable are repeated for each value it takes on. In particular, the well known "$\pi$" notation is used to indicate that the product is formed of all values induced in the expression on the right by the different values of the index variable used in that expression. Elements within a set are indexed by their position. For instance, consider the set $w=\{9,5,7\}$ and j w, then w(1) is 9, w(2) is 5, and w(3) is 7. Indexing in general is shown either using subscript notation or with the index in parenthesis. An effort has been made, though, to be consistent in this choice for each variable. As will be appreciated, the parenthesis notation has been used for those messages and variables appearing in the superscript or subscript positions.

Figure 1:
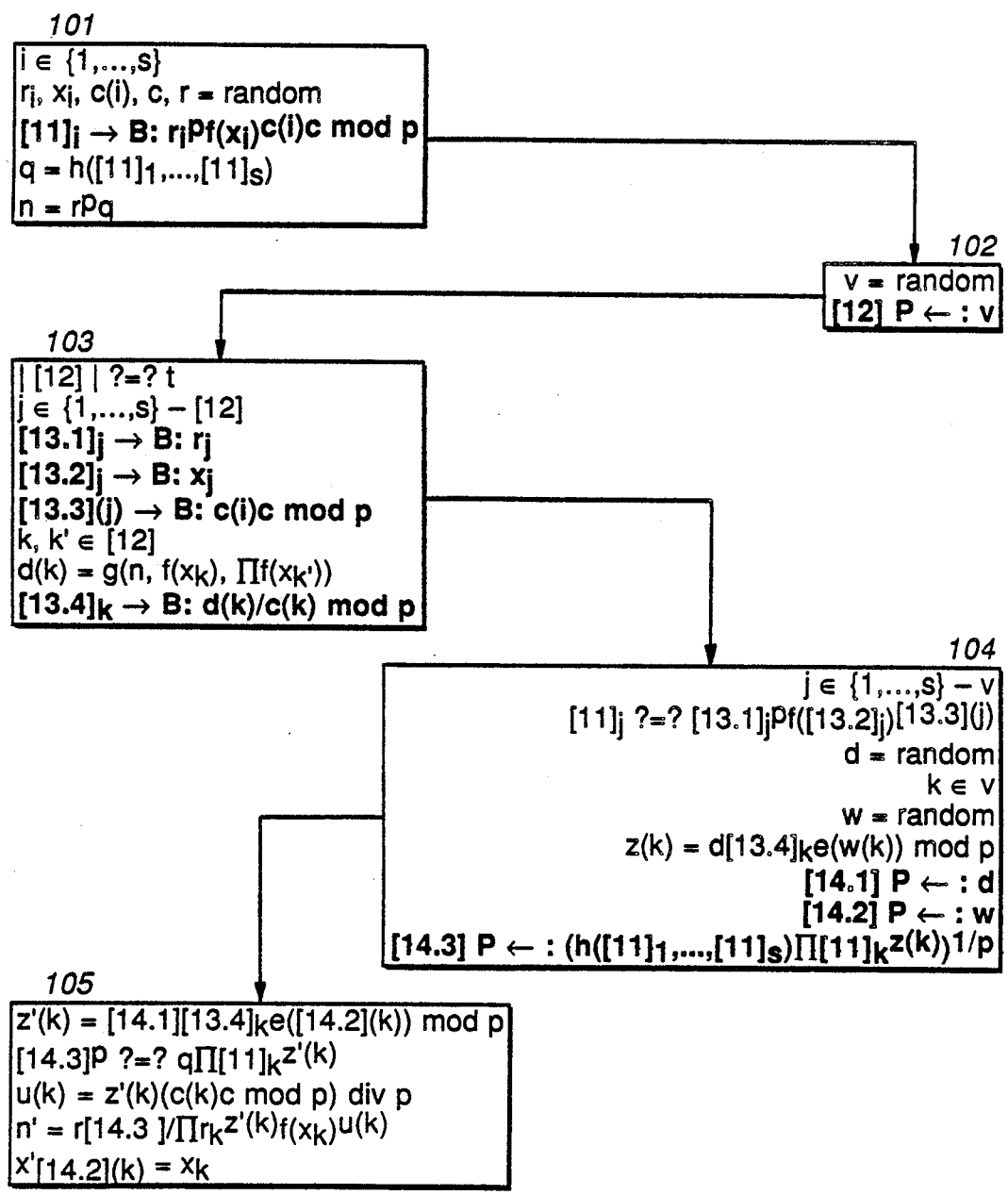
FIG. 1 shows a flowchart of a first preferred embodiment of a blind signature issuing protocol between a provider party and a blind signature issuing party in accordance with the teachings of the present invention.

Turning now to FIG. 1, the first part of a flowchart for a first preferred embodiment will now be described in detail. It may be thought of as a blind signature issuing transaction, in which party P obtains such a signature from party B.

Box 101 shows party P first choosing $r_i$, $x_i$, c(i), c, r independently and uniformly at random, such random selection as already mentioned. For each value of i, which ranges from 1 to s, a separate random choice is made for each of the first three. The $r_i$ are chosen from the elements of the multiplicative group modulo m used. The $x_i$ are chosen from some suitable set of values used as arguments for $f$. The c(i) are chosen from the integers from 1 to $p-1$. Similarly, c is also chosen from the elements of the multiplicative group modulo p. Also in like manner, r is chosen as an integer between 1 and $m-1$, inclusive.

Next P forms, for each value of i, a residue as message $[11]_i$. Consider a particular value of i. First $r_i$ is raised to the power p and saved as temp1. Then $f$ is applied to argument $x_i$, with the result saved as temp2. Next c(i) is multiplied by c and the remainder after dividing by p is saved as temp3; in other words the group operation is applied to the two elements in the multiplicative group modulo p. To form the message, temp2 is raised to the temp3 power and multiplied by temp1, all modulo m. Each of the s messages is then sent by P to B.

Certain additional computations are shown in the remainder of this box to suggest that they could, if desired, be done before box 103. One computation is to establish the value of the variable q as the result of applying the function h already mentioned. The arguments of h are taken as the s messages sent. But as already mentioned, such multiple arguments might be combined. The other computation forms n as r raised to the p power, the quantity times q, all modulo m, as already mentioned.

Box 102 indicates that, after receiving message $[11]_i$ for all i between 1 and s, B creates a random index set v of integers such that it contains t elements and these elements are chosen uniformly as integers between 1 and s. Then B sends this ordered set to P as message [12].

Box 103 describes first how the set received as message [12] by P is tested by P to ensure that its cardinality is exactly t. Then j is allowed to range over the set difference of the the set of natural numbers from 1 to s inclusive and [12]. For each value of j, P sends B $r_j$ as $[13.1]_j$, $x_j$ as $[13.2]_j$, and c(i) times c modulo p as $[13.4](j)$.

Next the variables k and k′ are allowed to range over the set [12]. For each value of k an image under g is formed and saved as d(k). The first argument for g will be the value assigned to variable n in box 101. The second argument for g is f applied to $x_k$. The third and final argument is the product of the images under f of all the $x_{k'}$.

As the closing operation of this box, t messages are sent to B, each message being an integer between 1 and $p-1$. For each value of index k, the corresponding message is formed as d(k) times the multiplicative inverse of c(k) modulo p. In other words, the multiplicative inverse modulo p of c(k) is first formed and then it is multiplied modulo p with d(k) to yield $[13.4]_k$.

Box 104 first illustrates the definition of index variable j, which is allowed to range over all values in the set difference between the natural numbers not exceeding s and v, a similar set difference already having been mentioned in box 103. B repeats a test for each value taken by j. Consider, for clarity, a particular value of j. Message $[11]_j$ received in box 102 is tested for equality with the product of two terms. The first term is received message $[13.1]_j$ raised to the p power. The second is f applied to received message $[13.2]_j$, the quantity raised to the $[13.3]_j$ power.

Provided all these tests are satisfied, as already mentioned, index variable k is allowed to range over the set v. Next an index set w is created at random but satisfying the property that those positions in w that are indexed by elements in v include all the indexes from 1 to t inclusive; in other words, when w is indexed by v, a permutation of the natural numbers not exceeding t results. For each value of k, z(k) is computed as the product of e(w(k)), d, and message $[13.3]_k$ received, all reduced modulo p. (The expression e(w(k)), as per the notation already defined, means select the k'th element from the ordered set of indexes called w and apply function e to the resulting index treated as a natural number). Next, d is sent to P as message [14.1]. This sending is shown at this point to suggest that d is preferably revealed to P only after all messages $[13.4]_k$ are received. When the function e is not the constant function and is used to mark the candidates as already mentioned, the ordering of the candidates is also preferably only revealed at this point; accordingly, w is sent as message [14.2].

The final signature, returned to P in message [14.3], is the p'th root of an image under h and the product of t terms. The arguments of h are the values of message $[11]_1$ through $[11]_t$, just as q was formed in box 101. There is a factor in the product for each value taken on by k. It is message $[11]_k$ raised to the z(k) power modulo m.

Box 105 depicts first the setting of z'(k) to the modulo p product of three terms: e([14.2](k)) already described in box 104, message [14.1] received from box 104, and message $[13.4]_k$ formed in box 103. Then equality is tested with received message [14.3] raised to the p as one side. The other side is q times a product taken over all k. Each factor in this product over k is the message $[11]_k$ raised to the z'(k) power.

Next a temporary variable u(k) is assigned a value for all k. Consider a particular value of index k. The computation may be described as first setting temp1 to the modulo p product of e([14.1](k)), message [14.1] received, and message $[13.4]_k$ received as denoted by z'(k), and then letting temp2 be the modulo p product of c(k) and c. The value of u(k) is then computed as the integer part of the quotient of temp1 times temp2 divided by p. In other words, u(k) is the largest integer that does not exceed the product of temp1 and temp2 when multiplied by p.

Next the signature that will actually be shown, n', is computed as the product of r and message [14.2] divided by a product taken over k. Each term of this product is $r_k$ raised to a first power times $f(x_k)$ raised to a second power. The first power is z'(k), as already described, and the second power is u(k), also as already described for this box.

Finally, a re-indexed version of x is shown for notational clarity and also possibly to save storage. The x' have indexes 1 to t; each $x_k$ is saved as x'[142](k), as per the notation already defined.

Turning now to FIG. 2, the second flowchart for part of the preferred embodiment will now be described in detail. It may be thought of as the revealing of a blind signature by P to S.

Box 201 begins with P forming message [21.1] as n' already defined in box 105. Message [21.2] is given the value of variable n retained from box 101. Message [21.3] is shown taking its value as the modulo p product of message [14.1] received in box 105 and variable c already defined in box 101. These three messages are sent to S. For index i ranging over the integers between 1 and t, messages $[21.4]_i$ are formed as $x'_i$, as defined in box 105, and are sent to S.

Box 202 shows that S first lets the index variable i range from 1 to t. Then it indicates how d'(i) is formed by applying g to some of the messages received. The first argument of $g_i$ is always message [21.2]. The next is message $[21.4]_i$. The final argument is the product of the $[21.4]_i'$. Finally an equality is tested by S. On the left is received message [21.1] raised to the p. On the right is a message [21.2] times a product over i. The i'th factor making up the product is f applied to message $[21.4]_i$, the quantity raised to a power. This power is the modulo p product of e(i), d'(i), and message [21.3]

Figure 3:
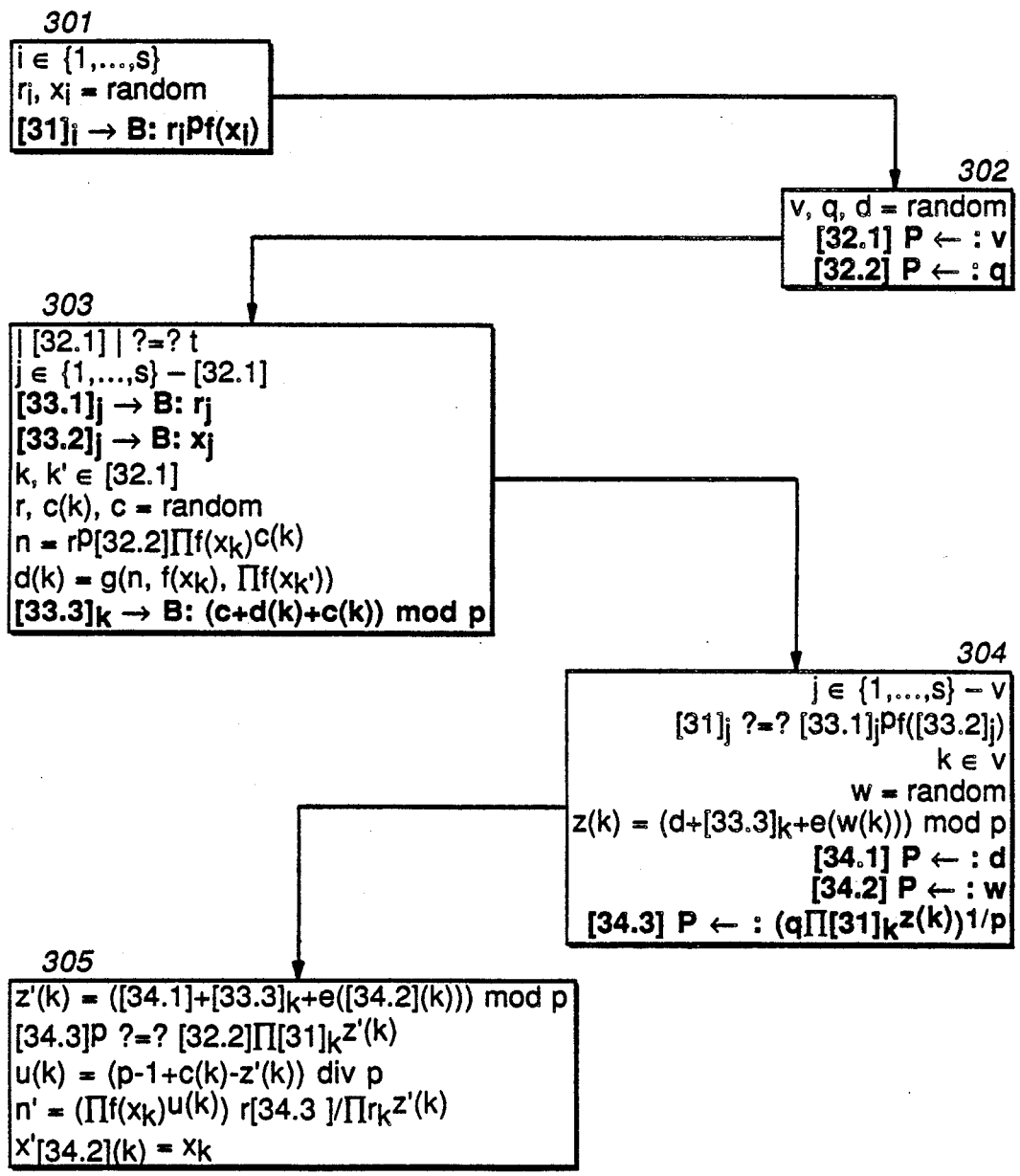
FIG. 3 shows a flowchart of a preferred embodiment of a second blind signature issuing protocol between a provider party and a blind signature issuing party in accordance with the teachings of the present invention.

Turning now to FIG. 3, the third flowchart for part of the preferred embodiment will now be described in detail. It may be thought of as a second blind signature issuing transaction, in which party P obtains a blind signature from party B.

Box 301 indicates how P first creates the $r_i$ as random residues modulo m and the $x_i$ as random elements in the domain of f, where i ranges over the natural numbers not exceeding s. Then message $[31]_i$ is formed and sent to B. It is a product of two factors: $r_i$ raised to the p; and the image under f of $x_i$.

Box 302 then defines how, after receiving $[31]_i$, or at least some commit to them, B creates a three things independently and at random: v, a random ordered subset of t integers between 1 and k; q, a random residue modulo m; and d, a random value between 0 and p−1. Then B forwards v as message [31.1] and q as [31.2] to P.

Box 303 shows how P first checks message [32.1] received, by ensuring that its cardinality is t. Next j is allowed to range over the complement of set [32.1], that is all the indexes in 1 to s that are not in v. Then the $r_j$ and $x_j$ are sent to B as messages $[33.1]_j$ and $[33.2]_j$, respectively. Both k and k' are allowed to run over the index set [32.1]. A random residue modulo m is assigned variable r, and each c and all c(k) are set to random integers between 0 and p−1. Now n can be set to the product of three factors: r raised to the p power; message [32.2] received; and a product over k of images under f of $x_k$ each raised to the c(k) power. This allows d(k) to be set to an image under g where the first argument is n. The second argument is $f(x_k)$. The third argument is the product over k' of f applied to each $x_{k'}$. At last message $[33.3]_k$ can be computed and sent to B. Its value is the modulo p sum of c, d(k), and c(k).

Box 304 is first the recovery and checking by B of the $[31]_j$ received from box 301 and the $[33.1]_j$ and $[33.2]_j$ received from box 303. For all j in 1 to s but not in v, $[31]_j$ is checked for equality with the product of $[33.1]_j$ raised to the p and f applied to $[33.2]_j$. Provided this holds, B proceeds by allowing k to range over v. A set w is formed at random with the constraint that when indexed by elements in v, every natural number not exceeding t results. Variable z(k) is set to the modulo p sum of three terms: d, message $[33.3]_k$ received, and e applied to w indexed by k. Sending of d to P as message [34.2] is shown at this point to suggest that this value is preferably not revealed to P until messages $[33.3]_k$ have been received. Also sent P is message [34.2] containing w. The signature [34.3] is computed and sent to P. It is the p'th root of the product of q and a product over k of the $[31]_k$ each raised to the corresponding z(k).

Box 305 depicts first the setting of z'(a) by P as the modulo p sum of message [34.1] received, message $[33.3]_k$ sent in box 303, and function e applied to message [34.2] received indexed by k. Then message [34.3] received is tested by raising it to the p and checking that the result equals a product. One factor in the product is message [32.2] already received. The other is the product over k of messages $[31]_k$ each raised to the corresponding z'(k). Next u(a) is developed in three stages. First z'(k) is taken. Then this value is subtracted from the integer c(k), and p−1 is added as an integer. As per the definition of the notation, the resulting integer is divided by p and the integer remainder becomes u(k). Then n' is set to the product of four factors. The first factor is the product over k of f applied to $x_k$ raised to the corresponding u(k). The second factor is r, the third is message [34.3], and the fourth is the multiplicative inverse of a product over k of $r_k$ raised to the corresponding z'(k) power. Finally, x' indexed by message [34.2] indexed by k is set to $x_k$, in a similar way as in box 105.

Figure 4:
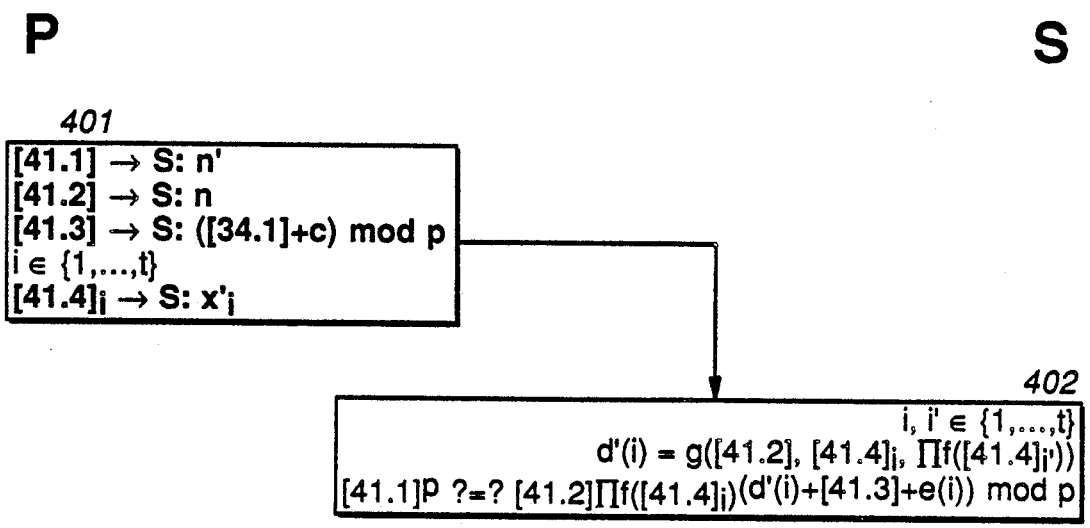
FIG. 4 shows a flowchart of a preferred embodiment of a second blind signature showing protocol between a provider party and a signature checking party in accordance with the teachings of the present invention.

Turning now to FIG. 4, the fourth flowchart for part of the preferred embodiment will now be described in detail. It may be thought of as the second protocol allowing P to reveal a blind signature to S.

Box 401 shows P sending message [41.1], [41.2], and [41.3] to S containing, respectively, n', n, and the modulo p sum of message [34.1] with c. Then, with i ranging between 1 and t, message [41.4]$_i$ is sent S containing x'$_i$.

Box 402 indicates first how S lets i and i' both range over the natural numbers not exceeding t. Then d'(i) is computed as the image under g of three arguments. The first is message [41.2] received; the second is message [41.4]$_i$; and the third is the product over i' of the image under f of received message [41.4]$_{i'}$. Now S can check the signature [41.1] by raising it to the p power and checking the result for equality with a product of two factors. The first is message [41.2]. The second is the product over i of f applied to message [41.1]$_i$ raised to a power. This power is the modulo p sum of d'(i), received message [41.3], and e(i).

Turning now to FIG. 5, a fifth flowchart for a preferred embodiment will now be described in detail. It may be thought of as a blind signature issuing transaction, in which party P obtains such a signature from party B.

Box 501 shows party P first choosing x, r, s, and c independently and uniformly at random, such random selection as already mentioned. The first three, x, r, and s, are chosen from the residues modulo m; the last is chosen from the integers 1 to p−1. Message [51.1] is formed, before being sent to B, as r raised to the p, the quantity times the image of x under f. A value for q is developed as the function h applied to message [51.1]; but, selection of q as a function of candidates, as in FIG. 1, or random choice of q by B, as in FIG. 3, are also of course suitable. Next n is formed as the product of q to the power c times the quantity s to the power p. Variable d is set to the image of n under function g. Then message [51.2] is shown being sent to B. It contains the product of d and c reduced modulo p.

Two values, a and b are shown as being developed after the messages of this box have been sent. This placement of computations is intended to suggest that they can be performed in advance of box 503 in some embodiments, but naturally they could also be computed later. Variable a gets the value of q raised to the content of message [51.2] already mentioned. Variable b gets the product of three factors: q raised to the power determined by the integer remainder after dividing d times c by p; s raised to the d power; and the multiplicative inverse of r.

Box 502 indicates that, after receiving messages [51.1] and [51.2], B creates and returns a signature as message [52]. B computes this signature as the p'th root of a product. One factor in the product is the image of message [51.1] under function h, the quantity raised to the message [51.2] power; the other factor is message [51.1].

Box 503 describes first how the signature received as message [52] by P is tested by P. It is raised to the p power and the result is tested for equality with the product of variable a, set in box 501, with message [51.1], sent in box 501. Finally variable n' is set to the product of the quantity b, defined in box 501, times message [52].

Turning now to FIG. 6, the sixth flowchart for part of the preferred embodiment will now be described in detail. It may again be thought of as the revealing of a blind signature by P to S.

Box 601 begins with P forming message [61.1] as n' already defined in box 503. Message [61.2] is next given the value of variable n retained from box 501. Then message [61.3] is shown taking its value as variable x also from box 501. These three messages are sent by P to S.

Box 602 shows how S test these three messages received. Message [61.1] is raised tot the p power and the result is checked for equality with the product of two factors. The first factor is message [61.2] raised to a power that is the image of message [61.2] under function g already defined. The second factor is the image of message [61.3] under function f, as already defined.

As would be obvious to those of ordinary skill in the art, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition and are sometimes arbitrary. Notice, for example, that whether a signature is first tested in blinded form and then unblinded, as shown for clarity here, or unblinded and then tested, is quite unessential. Also, for example, the order in which messages are generated within a box and sent may be of little or no significance.

It will also be obvious to those of ordinary skill in the art how parts of the inventive concepts and protocols herein disclosed can be used to advantage without necessitating the complete preferred embodiment. This may be more fully appreciated in light of some examples. FIGS. 1–4, for example, show a variety of techniques, some of which can be omitted if desired: the marking by way of the e function; the use of more than one candidate; and the unpredictable value in the signatures.

Certain variations and substitutions may be apparent to those of ordinary skill in the art. For example, any abelian group with public group operation and order known only to B can be used instead of RSA. Other types of blinding could also be used, such as those called "unanticipated" blind signatures. Instead of a prime p, as already mentioned, composites could of course be used.

Other example substitutions and variations related to the form of the numbers signed would be obvious also. The redundancy scheme shown does not explicitly include side information that is not signed but that is later used to verify the redundancy properties, as is well known in the art.

Public-key digital blind signature apparatus for practicing this invention is symbolically depicted in FIG. 7. Here, the data processor means 702 of a providing party provides at least one candidate message from means 704 to the data processor means 706 of a blind signature issuing party over a suitable data communication link (indicated by dotted lines). Processor 706 and associated means 708 receives such provided candidate message(s). Processor 706 and associated means 710 then applies an exponent to at least one such candidate message(s) that cannot readily be determined by the providing party. Then, processor 706 in association with means 712 returns a first signature including said exponent to the providing party (which receives it at means 714). Processor 706 with associated means 716 also forms a second digital signature using said at least one candidate message that is unlinkable to the first signature issued. Processor 706 and associated means 710 is also capable of applying an exponent independent of the message content and that is different for different messages issued.

While these descriptions of the present invention have been given as examples, it will be appreciated by those of ordinary skill in the art that various modifications, alternate configurations and equivalents may be employed without departing from the spirit and scope of the present invention.

What is claimed is:

1. In a public-key digital blind signature method, the improvement comprising the steps of:
    providing at least one candidate message by a providing party to a blind signature issuing party;
    receiving at least one candidate message by said issuing party;
    applying, by said issuing party, a public exponent that cannot be determined by said providing party, to at least one of said candidate messages received;
    returning, by said issuing party, a resulting first signature including said exponent to said providing party; and
    forming by said issuing party of a second digital signature using said at least one candidate message that is unlinkable to said first signature.

2. In a public-key digital blind signature method, the improvement comprising the steps of:
    providing at least one candidate message by a providing party to a blind signature issuing party;
    receiving at lest one candidate message by said issuing party;
    applying, by said issuing party, a public exponent that is independent of the message content of said at least one candidate message and that is different for different signatures issued, to said at least one candidate message received;
    returning, by said issuing party, a resulting first signature including said exponent to said providing party; and
    forming by said issuing party of a second digital signature using said at least one candidate message that is unlinkable to said first signature.

3. In public-key digital blind signature apparatus, the improvement comprising:
    means for providing at least one candidate message by a providing party to a blind signature issuing party;
    means for receiving at least one candidate message by said issuing party;
    means for applying an exponent by said issuing party, that cannot readily be determined by said providing party, to at least one of said candidate messages received;
    means for returning a resulting first signature including said exponent by said issuing party to said providing party; and
    means for forming by said issuing party of a second digital signature using said at least one candidate message that is unlinkable to said first signature issued.

4. In public-key digital blind signature apparatus, the improvement comprising:
    means for providing at least one candidate message by a providing party to a blind signature issuing party;
    means for receiving at least one candidate message by said issuing party;
    means for applying an exponent by said issuing party, with the exponent independent of the message content of said at least one candidate message received, and that is different for different messages issued, to at least one of said candidate messages;
    means for returning a resulting first signature including said exponent by said issuing party to said providing party; and
    means for forming by said issuing party of a second digital signature using said at least one candidate message that is unlinkable to said first signature issued.

* * * * *